US012609899B2

(12) United States Patent
Beracha et al.

(10) Patent No.: US 12,609,899 B2
(45) Date of Patent: Apr. 21, 2026

(54) POSITIVE AND NEGATIVE NOTIFICATIONS FOR ADAPTIVE ROUTING

(71) Applicant: MELLANOX TECHNOLOGIES, LTD., Yokneam (IL)

(72) Inventors: Eran Gil Beracha, Tel Aviv (IL); Liron Mula, Herzliya (IL); Tal Mund, Herzliya (IL); Idan Solomon Seider, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 18/545,015

(22) Filed: Dec. 19, 2023

(65) Prior Publication Data

US 2025/0202822 A1     Jun. 19, 2025

(51) Int. Cl.
 *G06F 15/16* (2006.01)
 *H04L 45/748* (2022.01)
 *H04L 47/122* (2022.01)
 *H04L 47/28* (2022.01)

(52) U.S. Cl.
 CPC .......... *H04L 47/122* (2013.01); *H04L 45/748* (2013.01); *H04L 47/28* (2013.01)

(58) Field of Classification Search
 None
 See application file for complete search history.

(56) References Cited

U.S. PATENT DOCUMENTS

| | | | | |
|---|---|---|---|---|
| 6,208,619 | B1 * | 3/2001 | Takeuchi | H04L 47/30 |
| | | | | 370/468 |
| 8,225,399 | B1 * | 7/2012 | Van der Merwe | H04L 69/22 |
| | | | | 726/23 |
| 10,122,639 | B2 * | 11/2018 | Toy | H04L 47/283 |
| 2004/0196790 | A1 * | 10/2004 | Balakrishnan | H04L 47/10 |
| | | | | 370/232 |
| 2004/0218617 | A1 * | 11/2004 | Sagfors | H04L 47/32 |
| | | | | 370/229 |
| 2014/0269378 | A1 * | 9/2014 | Holbrook | G11C 11/4093 |
| | | | | 370/252 |
| 2017/0324641 | A1 * | 11/2017 | Ertugay | H04L 43/0811 |
| 2022/0191142 | A1 * | 6/2022 | Mermoud | H04L 45/64 |
| 2022/0217090 | A1 * | 7/2022 | Bataineh | H04L 47/2466 |
| 2023/0061885 | A1 * | 3/2023 | Dauwe | H04L 47/722 |
| 2023/0198895 | A1 * | 6/2023 | Baniamerian | H04L 45/38 |
| | | | | 370/238 |
| 2024/0380703 | A1 * | 11/2024 | Ranjan | H04L 1/187 |

* cited by examiner

*Primary Examiner* — Phuoc H Nguyen
(74) *Attorney, Agent, or Firm* — Sheridan Ross P.C.

(57) ABSTRACT

Systems, devices, and methods are provided. In one example, a system is described that includes circuits to receive a packet associated with a destination from a source, determine a congestion associated with the destination, determine the congestion associated with the destination is outside a range, based on determining the congestion associated with the destination is outside the range, generate a notification packet, and send the notification packet to the source.

18 Claims, 4 Drawing Sheets

POSITIVE AND NEGATIVE NOTIFICATIONS FOR ADAPTIVE ROUTING

FIELD OF THE DISCLOSURE

The present disclosure is generally directed toward networking and, in particular, toward networking devices and methods of operating the same.

BACKGROUND

Switches and similar network devices represent a core component of many communication, security, and computing networks. Switches are often used to connect multiple devices to form networks.

Devices including but not limited to personal computers, servers, and other types of computing devices, may be interconnected using network devices such as switches. Such interconnected entities may form a network enabling data communication and resource sharing among the nodes. Often multiple potential paths for data flow may exist between any pair of devices. This feature allows data to traverse different routes from a source device to a destination device. Such a network design enhances the robustness and flexibility of data communication as it provides alternatives in case of path failure, congestion, or other adverse conditions. Moreover, such a network design facilitates load balancing across the network, optimizing the overall network performance and efficiency.

BRIEF SUMMARY

In accordance with one or more embodiments described herein, a computing system, such as a switch, may enable a diverse range of systems, such as switches, servers, personal computers, and other computing devices, to communicate across a network. Ports of the computing system may function as communication endpoints, allowing the computing system to manage multiple simultaneous network connections with one or more nodes. The computing system, which may be referred to herein as a switch, may perform one or more methods involving the generation and sending and/or the receipt and handling of positive and negative adaptive routing notification (ARN) packets. Such packets, as described herein, may be used to reduce congestion throughout a network as well as to avoid issues caused by such congestion.

The present disclosure describes systems and methods for enabling a switch or other computing system to generate ARN packets based on congestion in a network and to route packets based on received ARN packets in such a way as to solve the above-noted shortcomings associated with congestion in the network. As an illustrative example aspect of the systems and methods disclosed, a switch may include one or more circuits to receive a packet associated with a destination from a source, determine a congestion associated with the destination, determine the congestion associated with the destination is outside a range, and based on determining the congestion associated with the destination is outside the range, generate a notification packet; and send the notification packet to the source.

The above example aspect includes one or more of wherein the range includes an upper threshold and a lower threshold, wherein the congestion associated with the destination is higher than the upper threshold and the notification packet is a negative notification packet, wherein after sending the negative notification packet to the source, the switch receives a reduced amount of traffic associated with the destination from the source, wherein the congestion associated with the destination is lower than the lower threshold and the notification packet is a positive notification packet, wherein after sending the positive notification packet to the source, the switch receives an increased amount of traffic associated with the destination from the source, wherein the congestion associated with the destination is determined based on one or more of a queue latency and a queue occupancy, wherein the notification packet comprises one of a positive indication and a negative indication and an indication of the destination, and wherein the one or more circuits are further to execute a timer and wherein generating the notification packet is further based on the timer.

In another illustrative example, a system includes one or more circuits to receive a notification packet associated with a first destination of a plurality of destinations, associate the notification packet with an entry of a table associated with the first destination, wherein the table includes a plurality of entries, wherein each entry indicates a bandwidth for a respective destination of the plurality of destinations, and one of increase and decrease the entry of the table associated with the first destination associated with the notification packet based on data in the notification packet.

The above example aspect includes one or more of wherein associating the notification packet with the entry of the table comprises identifying the first destination associated with the notification packet, wherein the notification packet comprises at least a portion of a packet sent from the system, wherein the one or more circuits are further to execute a timer and one of increase and decrease each entry of the table based on the timer, wherein one of increasing and decreasing each entry of the table based on the timer comprises increasing the bandwidth for each of the plurality of destinations, wherein the notification packet includes one of a positive indication and a negative indication, wherein associating the notification packet with the entry of the table comprises performing a longest prefix match algorithm, wherein each entry of the table is associated with a maximum bandwidth and a minimum bandwidth, and wherein the one or more circuits are further to route one or more packets based on the table.

In yet another illustrative example, a device includes one or more circuits to receive a packet associated with a first destination from a source, wherein the first destination is one of a plurality of destinations, determine a congestion associated with the first destination, determine the congestion associated with the first destination is outside a range, based on determining the congestion associated with the first destination is outside the range, generate a first notification packet, send the first notification packet to the source, receive a second notification packet, wherein the second notification packet is associated with a second destination of the plurality of destinations, associate the second notification packet with an entry of a table associated with the destination, wherein the table includes a plurality of entries, wherein each entry indicates a bandwidth for a respective destination of the plurality of destinations, and one of increase and decrease the entry of the table associated with the second destination associated with the second notification packet based on data in the second notification packet.

The above example aspect includes wherein the congestion associated with the first destination is compared with two thresholds including an upper threshold and a lower threshold.

The routing approaches depicted and described herein may be applied to a switch, a router, or any other suitable type of networking device known or yet to be developed. Additional features and advantages are described herein and will be apparent from the following description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
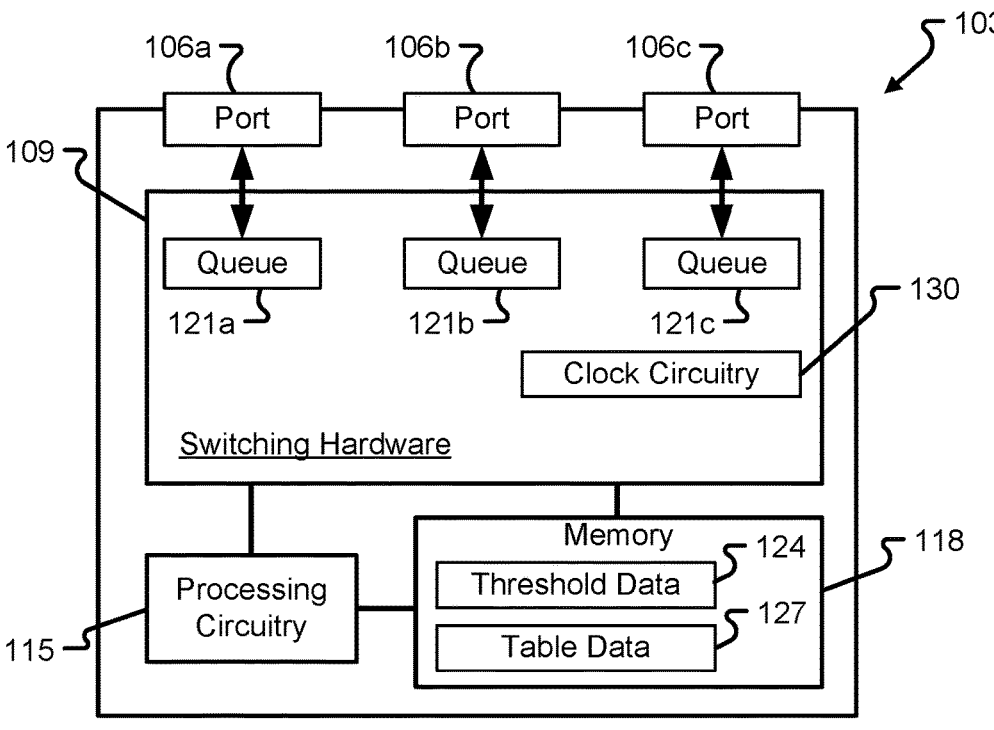
FIG. 1 is a block diagram depicting an illustrative configuration of a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably, and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIGS. 1-6, various systems and methods for routing packets between switches and nodes will be described. The concepts of packet routing depicted and described herein can be applied to the routing of information from one computing device to another. The term packet as used herein should be construed to mean any suitable discrete amount of digitized information. The data being routed may be in the form of a single packet or multiple packets without departing from the scope of the present disclosure. Furthermore, certain embodiments will be described in connection with a system that is configured to make centralized routing decisions whereas other embodiments will be described in connection with a system that is configured to make distributed and possibly uncoordinated routing decisions. It should be appreciated that the features and functions of a centralized architecture may be applied or used in a distributed architecture or vice versa.

Figure 2:
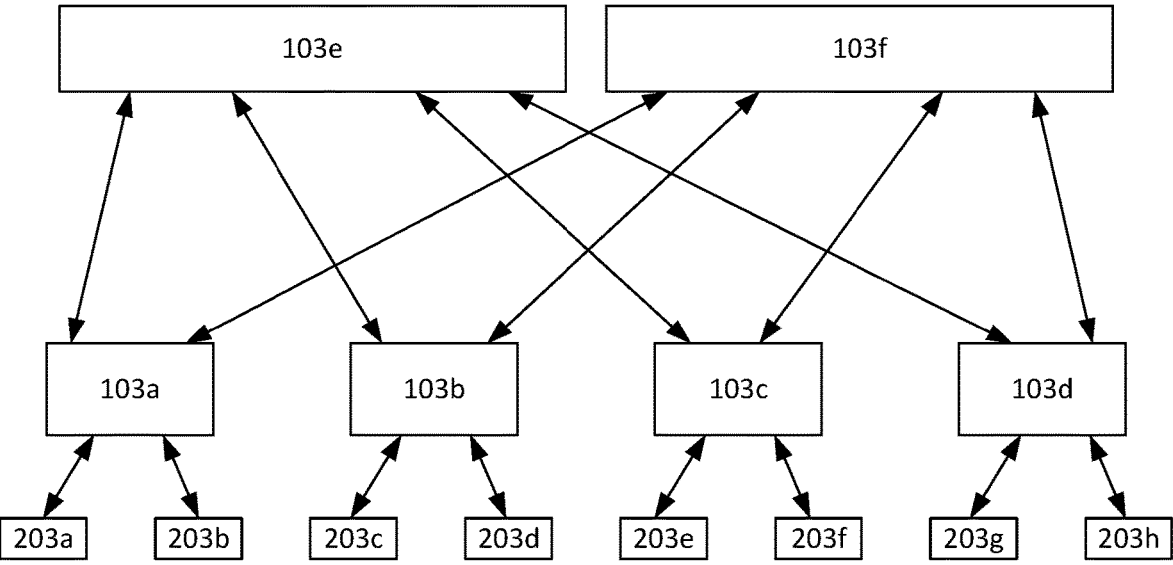
FIG. 2 illustrates a network of computing systems and nodes in accordance with at least some embodiments of the present disclosure.

As illustrated in FIG. 1, a switch 103 as described herein may be a computing system comprising a number of ports 106a-c which may be used to interconnect with other switches 103 and/or computing systems and network devices, which may be referred to as nodes, to make up a network. For example, and as illustrated in FIG. 2, a switch 103 may be a spine switch 103e, 103f and/or a leaf switch 103a-d and may connect to other switches 103 and/or nodes 203a-h. Such a network of switches 103 and nodes 203 may be useful in various settings, from data centers and cloud computing infrastructures to artificial intelligence systems.

Switches 103, as described in greater detail herein, may enable communication between switches 103 and/or nodes 203. A switch 103 may be, for example, a switch, a network interface controller (NIC), or other device capable of receiving and sending data, and may act as a central node in the network. Switches 103 may be wired in a topology including spine switches, top-of-rack (TOR) switches, and/or leaf switches, for example. Switches 103 may be capable of receiving, processing, and forwarding data, e.g., packets, to appropriate destinations within the network, such as other switches 103 and/or nodes 203. In some implementations, a switch 103 may be included in a switch box, a platform, or a case which may contain one or more switches 103 as well as one or more power supply devices and other components.

In some implementations, a switch 103 may comprise one or more ports 106*a-c* connected to one or more ports of other switches 103 and/or nodes 203. Processes, such as applications executed by nodes 203 may involve transmitting data to other nodes 203 of the network via switches 103. Data may flow through the network of switches 103 and nodes 203 using one or more protocols such as transmission control protocol (TCP), user datagram protocol (UDP), or Internet protocol (IP), for example. Each switch 103 may, upon receiving data from a node 203 or another switch 103 examine the data to identify a destination for the data and route the data through the network.

Data may be routed through the network in routes chosen at least in part based on table data 127 stored in memory 118 of each switch 103 which handles the data. For example, and as described in greater detail herein, a switch 103 may implement an adaptive routing mechanism in which the switch 103 chooses a particular port 106*a-c* from which to forward a particular packet based on state data in a table. Such state data may indicate an amount of bandwidth, such as in terms of percentage and/or a data rate, for any possible route a packet may take to reach its destination.

Each node 203 may be a computing unit, such as a personal computer, server, or other computing device, and may be responsible for executing applications and performing data processing tasks. Nodes 203 as described herein may range from servers in a data center to desktop computers in a network, or to devices such as internet of things (IoT) sensors and smart devices as examples.

Each node 203 may for example include one or more processing circuits, such as graphics processing units (GPUs), central processing units (CPUs), application-specific integrated circuits (ASICs), field programmable gate arrays (FPGAs), or other circuitry capable of performing computations, as well as memory and storage resources to run software applications, handle data processing, and perform specific tasks as required. In some implementations, nodes 203 may also or alternatively include hardware such as GPUs for handling intensive tasks for machine learning, artificial intelligence (AI) workloads, or other complex processes.

For example, nodes 203 communicating via switches 103 may operate as a high-performance computing (HPC) cluster. A cluster of nodes 203 may comprise numerous interconnected servers, each equipped with CPUs and/or GPUs. The nodes 203 may provide computational horsepower for, as an example, training large-scale AI models or running complex scientific simulations. For AI and machine learning tasks, the nodes 203 may comprise one or more GPUs or other processing circuitry which may be capable of handling parallel processing requirements of neural networks and other applications.

Nodes 203 may be client devices which, for example, engage in AI-related, research-related, and other processor-intensive tasks, and utilize a network of switches 103 and other nodes 203 to handle the computational loads and data throughput required by such intensive applications. Such nodes 203 may include, for example, workstations and personal computers used by researchers, data scientists, and professionals for developing, testing, and running AI models and research simulations.

A switch 103 as described herein may in some implementations be as illustrated in FIG. 1. Such a switch 103 may include a plurality of ports 106*a-c*, queues 121*a-c*, switching hardware 109, processing circuitry 115, and memory 118. The ports 106*a-c* of a switch 103 may be capable of facilitating the transmission of data packets, or non-packetized data, into, out of, and through the switch 103. Such ports 106*a-c* may serve as interface points where network cables may be connected, connecting the switch 103 with other switches 103, and/or nodes 203.

Each port 106 may be capable of receiving incoming data packets from other devices and/or transmitting outgoing data packets to other devices. In some implementations, ports 106 may be configured to operate as either dedicated ingress or egress ports 106 or may be enabled to operate in a dual functionality capable of performing ingress and egress functions. For example, an egress port 106 may be used exclusively for sending data from the interconnect device and an ingress port 106 may be used solely for receiving incoming data into the switch.

Switching hardware 109 of a switch 103 may be capable of handling a received packet by determining a port 106 from which to send the packet and forwarding the packet from the determined port 106. Using a system or method as described herein, switching hardware 109 may be capable of adjusting an amount of bandwidth for possible routes for routing packets based on received ARN packets. Switching hardware 109 may also be capable of generating ARN packets for sending to other switches 103 in response to received packets based on congestion associated with various destinations and/or ports 106*a-c* as described herein.

Each port 106 of a switch 103 may be associated with one or more queues 121*a-c*. When a packet, or data in any format, is to be sent from a port 106, the packet may be stored in a queue 121 associated with the port 106 until the port 106 is ready to send the packet. When congestion occurs, a backlog of data in queues 121 may build. By monitoring an amount of data in each queue, as described herein, the switch 103 may be enabled to determine a congestion associated with each queue 121 and/or a congestion associated with the ports 106 associated with the queues 121.

Switching hardware 109 of a switch 103 may also include clock circuitry 130. Clock circuitry 130 may be used by switching hardware 109 and/or other components of the switch 103 to implement functions such as aging timers and ARN generation timers as described in greater detail below. In some implementations, clock circuitry may comprise a crystal oscillator or other circuit capable of providing an electrical signal at a particular frequency. Clock circuitry 130 may also or alternatively include one or more clock generators and other elements capable of providing counters and timers as described herein.

In support of the functionality of the switching hardware 109, processing circuitry 115 may be configured to control aspects of the switching hardware 109 to adaptive routing in relation to ARN packets. The processing circuitry 115 may in some implementations include a CPU, an ASIC, and/or other processing circuitry which may be capable of handling computations, decision-making, and management functions required for operation of the switch 103.

Processing circuitry 115 may be configured to handle management and control functions of the switch 103, such as setting up routing tables, configuring ports, and otherwise managing operation of the switch 103. Processing circuitry 115 may execute software and/or firmware to configure and manage the switch 103, such as an operating system and management tools. In some implementations, the processing circuitry 115 may be configured to receive ARN packets and/or threshold settings from external devices such as other switches 103 and/or nodes 203. Processing circuitry 115 may be capable of adjusting table data 127 and/or threshold data 124, as described in greater detail below, and instructing switching hardware 109 to function in accordance with the table data 127 and threshold data 124.

Memory 118 of a switch 103 as described herein may comprise one or more memory elements capable of storing configuration settings, threshold data 124, table data 127, application data, operating system data, and other data. Such memory elements may include, for example, random access memory (RAM), dynamic RAM (DRAM), flash memory, non-volatile RAM (NVRAM), ternary content-addressable memory (TCAM), static RAM (SRAM), and/or memory elements of other formats.

Threshold data 124 as described herein may be values to which congestion amounts may be compared. For example, and as described in greater detail below, threshold data 124 may include an upper threshold and a lower threshold. Threshold data 124 may be written to a switch 103 by nodes 203 such as by users such as through the editing of configuration settings or may be programmed through an operating system of the switch 103.

Figures 3, 4:
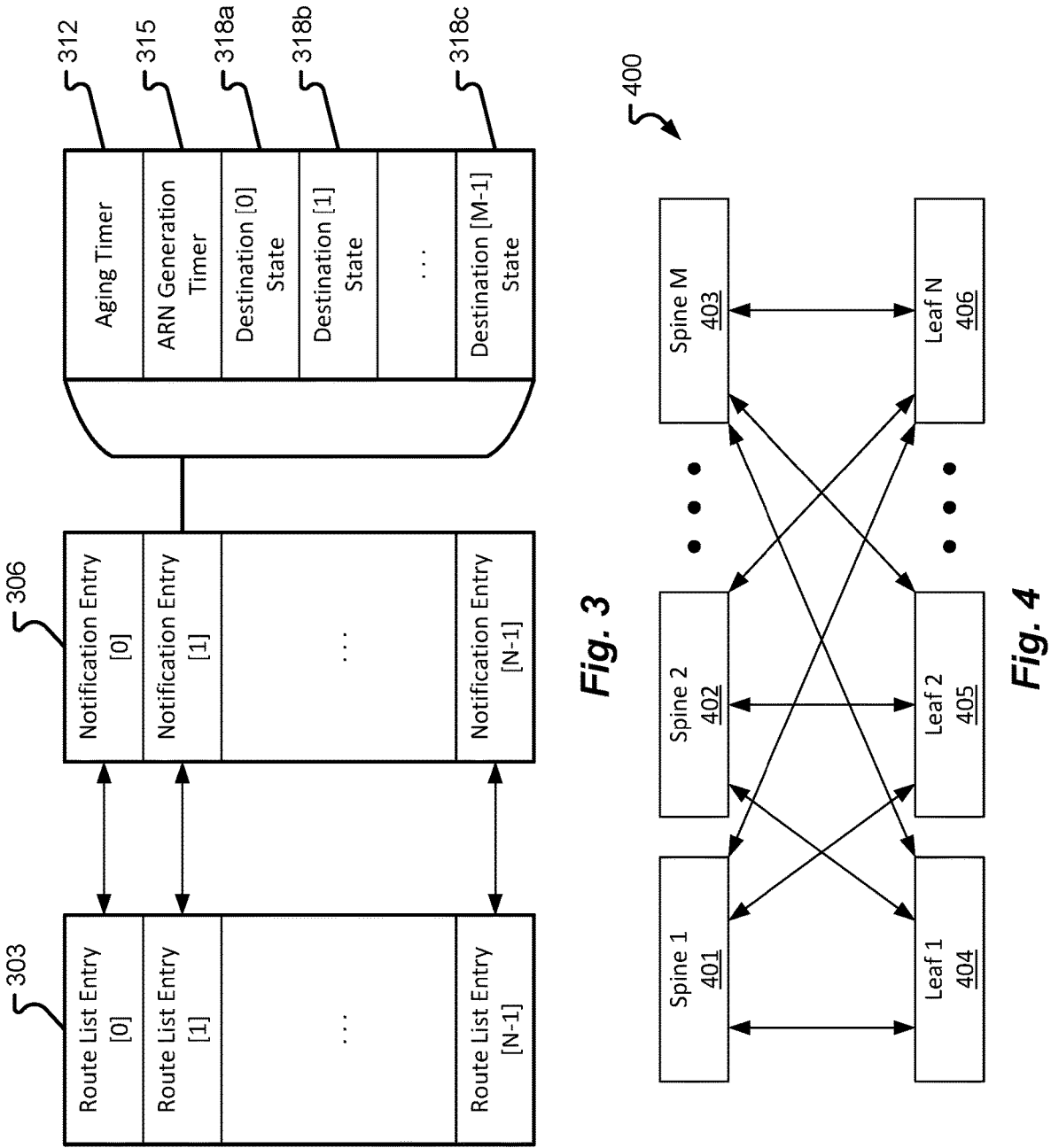
FIG. 3 illustrates table data in accordance with at least some embodiments of the present disclosure.
FIG. 4 illustrates a network of leaf switches and spine switches in accordance with at least some embodiments of the present disclosure.

Table data 127 may include a route list table 303 and a state table 306 as illustrated in FIG. 3 and described below. As a switch 103 operates, the switch 103 may receive and generate ARN packets and update the table data 127 based on received ARN packets as described below. Table data 127 may be used by switching hardware 109 to perform adaptive routing such as, when a packet is received, to determine from which port 106 the packet should be forwarded to reach the destination of the packet.

For example, as illustrated in FIG. 2, a number of switches 103*a-f* may be interconnected and also connected to nodes 203*a-h* to form a network. Each arrow in FIG. 2 may represent any number of one or more connections between the various elements. For example, ports of a first switch 103*a* may be connected to one or more ports of a second switch 103*e*, one or more ports of a third switch 103*f*, and one or more ports of each of nodes 203*a* and 203*b*. Each connection between a switch 103 and another switch 103 or node 203 may be used to carry multiple flows. Flows may also be static flows or adaptive routing flows. Static flows may be flows which cannot be rerouted via different routes through the network while adaptive routing flows may be flows which can be routed via a variety of different routes to reach the proper destination. As an example, each node 203*a-h* may transmit static flows and/or adaptive flows to other nodes 203*a-h* via the switches 103*a-f*.

As should be appreciated, the specific interconnections of the switches 103*a-f* and nodes 203*a-h* illustrated by FIG. 2 are provided for illustration purposes only and should not be considered as limiting in any way. While the network illustrated in FIG. 2 only includes 2 layers of switches 103, it should be appreciated additional layers may be introduced and switches may be interconnected in any conceivable manner. For example, in some implementations, a network as described herein may contain multiple switches 103 interconnected in a topology such as a Clos network or a fat tree topology network.

In a network of switches as described herein, remote congestion is a problem which may occur when data traverses the network. For example, in the network illustrated in FIG. 2, consider the scenario in which a first switch 103*a* and a second switch 103*b* are each sending large amounts of data to a third switch 103*c* via a spine switch 103*e*. The communication channels between the spine switch 103*e* and the third switch 103*c* may be operating at a high bandwidth and are experiencing congestion.

In the event that a fourth switch 103*d* receives a packet with a destination indicating node 203*e* or node 203*f*, the fourth switch 103*d* may determine the packet must be sent to the third switch 103*c*. However, in a conventional network, the fourth switch 103*d*, having not interacted with the spine switch 103*e* in some time, may be unaware of any congestion between the spine switch 103*e* and the third switch 103*c*. As a result, the fourth switch 103*d* may select the spine switch 103*e* for sending the packet to the third switch 103*c*. In this way, the fourth switch 103*d* may contribute to the congestion between the spine switch 103*e* and the third switch 103*c*. Meanwhile, the spine switch 103*f* may be operating in an underutilized manner.

This problem occurs particularly when one or more switches in a network either do not perform adaptive routing or are involved in sending static flows which cannot be rerouted. However, using the systems and methods described herein, switches 103 may be enabled to avoid remote congestion by rerouting data in an adaptive manner. The systems and methods disclosed herein provide a mechanism in which an ARN packet, which may be referred to as a remote congestion notification, is sent from one switch to other switches in the network, such that a better routing decision can be made by switches receiving the ARN packet. In this way, as described herein, the ARN packet may serve as a feedback loop by indicating whether the switch receiving the ARN packet should increase or decrease traffic towards a specific route in the network.

As an example, consider a scenario in the network of switches 103*a-f* illustrated in FIG. 2 in which congestion is occurring on the communication link from switch 103*e* to switch 103*b*. If switch 103*e* receives data directed to a node 203*a*, 203*b*, 203*e-h* which requires communicating via one of switches 103*a*, 103*c*, or 103*d*, such data will not contribute to the congestion. But if switch 103*e* receives data directed to a node 203*c*, 203*d* which requires communicating via switch 103*b*, such data will contribute to the congestion. In the event that the switch 103*e* receives a packet directed to a node 203*c*, 203*d*, or otherwise requires communicating via the congested link with switch 103*b*, the switch 103*e* will, through a method as described herein, respond with a negative ARN packet instructing the source of the packet to send less data directed to the destination of the packet via switch 103*e*.

Such a method may be enabled through the maintaining of tables of data as illustrated in FIG. 3. The data illustrated in FIG. 3 may be stored as table data 127 in memory 118 of a switch. A route list table 303 and a state table 306 as illustrated in FIG. 3 may contain data which may be used by a switch 103 to perform routing of packets.

A route list table 303 may list all possible routes for forwarding a packet. Each entry in the route list table may be associated with a different destination switch, or a switch on the same level as the switch maintaining the route list table 303. For example, if the switch maintaining the route list table 303 is a leaf switch, each of the other leaf switches in the network may be represented as an entry in the table. The route list table 303 in FIG. 3 includes one entry for each destination, or leaf switch, where the network includes N destinations. Such a network 400 is illustrated in FIG. 4.

It should be appreciated that in some implementations, entries in the route list table 303 may be associated with switches and/or other types of computing devices at any level of the network, such as final destination nodes, leaf switches, or other destinations. In some implementations, a route list table 303 may include an entry for each port of a switch.

The route list table 303 may store information about all possible routes for routing packets traversing the switch. The route list table 303 may be used by an adaptive routing mechanism to forward packets. Each switch in a network may store a respective routing table with an entry for each destination switch which will contain all the possible routes towards that destination.

A state table 306 may include data which may be updated in response to ARN packets received from other switches. Each entry in the state table 306 may be associated with a respective entry in the route list table 303. Like the route list table 303 in FIG. 3, the state table 306 may include one entry for each destination, where the network includes N destinations.

Each entry in the state table 306 may include or be associated with a secondary table including an aging timer 312, an ARN generation timer 315, and a destination state 318a-c for each upper layer switch, such as spine switches, ToR switches, or other switches to which the switch holding the state table 306 in memory may send a packet when forwarding the packet.

In the example illustrated in FIG. 3, notification entry [1] includes M destination states 318. As illustrated in FIG. 4, the network 400 includes M spine switches 401, 402, 403 and N leaf switches 404, 405, 406.

Each destination state 318a-c of the state table 306 may indicate a bandwidth for a respective destination of the plurality of destinations. The bandwidth may be an integer and may indicate a bandwidth in terms of percentage or bits per second for example which should be sent towards the destination.

In some implementations, each destination state 318a-c of the table may be associated with a maximum bandwidth and a minimum bandwidth. For example, a minimum bandwidth may be zero bits per second while a maximum bandwidth may be a maximum capability of the switch.

As described below, when a positive ARN packet is received, the switch may increase a destination state 318 based on the ARN packet. When a negative ARN packet is received, the switch may decrease a destination state 318 based on the ARN packet. The response to ARN packets is described in greater detail below in relation to the method 600 of FIG. 6.

Each entry in the state table 306 may be associated with an aging timer 312. The aging timer 312 may be used to effectively reduce the effect of a received ARN packet over time by linearly or exponentially reducing values written in each destination state 318a-c of the state table 306. As a result, by using the aging timer 312, the switch will forget ARN packet information if no ARN packet is received for a particular amount of time.

In some implementations, the highest level switches in a network, such as the spine switches 401, 402, 403 of the network 400 of FIG. 4 may not receive ARN packets and, as a result, may not use an aging timer 312.

Each entry in the state table 306 may be associated with an ARN generation timer 315. The ARN generation timer may be used to decide how many ARN packets can be generated in a particular time window. An ARN generation timer may enable a switch of a network to avoid the loss of bandwidth caused by an excessive number of ARN packets in the network, and to smooth out the feedback system caused by the ARN packets.

In some implementations, the lowest level switches in a network, such as the leaf switches 404, 405, 406 of the network 400 of FIG. 4 may not generate ARN packets and as a result may not use an ARN generation timer 315.

To illustrate the tables 303, 306 of FIG. 3, consider the network 400 of FIG. 4. Each leaf switch 404, 405, 406 may store a route list table 303 with an entry for each of the other leaf switches 404, 405, 406 and a state table 306 with an entry for each of the other leaf switches 404, 405, 406. For example, leaf 1 404 may store a route list table 303 with N−1 entries and a state table 306 with N−1 entries. Each entry in the state table 306 of leaf 1 404 may include M destination states 318.

If leaf 1 404 receives an ARN packet which indicates a destination of leaf 2 405 from spine 1 401, then leaf 1 404 may locate the entry of the route list table 303 associated with leaf 2 405, match the entry of the route list table 303 associated with leaf 2 405 with the associated entry of the state table 306 for leaf 2 405, and adjust the destination state 318 for spine 1 401 of the entry of the state table 306 for leaf 2 405. This response to ARN packets is described in greater detail below in relation to the method 600 of FIG. 6.

When a first leaf switch 404 receives a packet for forwarding to a second leaf switch 405 via a spine switch 401, 402, 403, the first leaf switch 404 may locate a route list table 303 entry associated with the second leaf switch 405, check the notification entry of the state table 306 associated with the route list table 303 entry associated with the second leaf switch 405, and determine which of the M spine switches 401, 402, 403 to forward the packet via based on the destination states 318a-c.

Figure 5:
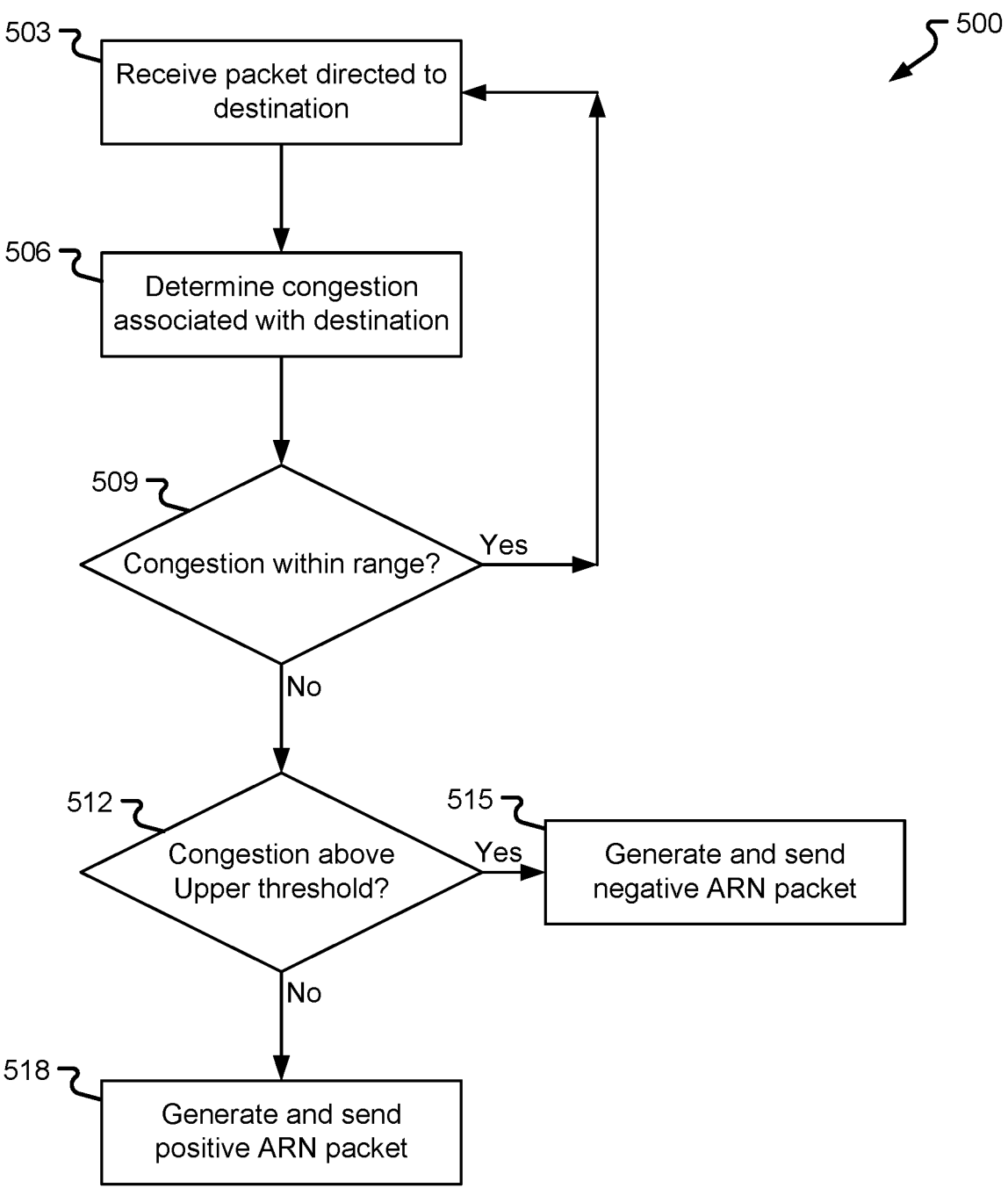
FIGS. 5 and 6 are flow diagrams depicting methods in accordance with at least some embodiments of the present disclosure.

As illustrated in FIG. 5, a switch 103, such as a spine switch 401, may perform a method 500 of generating positive and negative ARN packets in response to packets received from other switches 103, such as leaf switches 401, 402, 403. The method 500 may begin at 503 when the switch 103 receives a packet.

The packet received by the switch 103 may be received from a particular source and/or via a particular port 106 of the switch 103. In some implementations, the switch 103 may be enabled to determine the source of the packet, for example by examining a header of the packet and performing a MAC address table lookup.

The packet received by the switch 103 may be associated with a particular destination. For example, in some implementations, the switch 103 may be enabled to determine the destination of the packet, for example by examining a header of the packet and performing a MAC address table lookup.

When a packet is received by the switch 103, the packet may be forwarded using an adaptive routing mechanism. Based on the destination of the packet, the switch 103 may have a plurality of options for transmitting the packet. For example, in the network illustrated in FIG. 2, if a packet originating at node 203a with a destination of 203c is received by switch 103a, switch 103a must choose between forwarding the packet to spine switch 103e or spine switch 103f. On the other hand, after switch 103a forwards the packet to either spine switch 103e or spine switch 103f, the spine switch 103e or 103f will forward the packet to switch 103b to reach node 203c and will not require choosing between a plurality of valid options for forwarding the packet.

At 506, the switch 103 which received the packet may determine a congestion associated with the destination of the packet. For example, the switch 103 may determine one of a plurality of ports 106a-c from which to send the packet based on the destination of the packet, based on an adaptive routing mechanism, and/or other considerations. The switch 103 may next determine a congestion associated with the destination. Determining a congestion associated with the destination may involve determining a queue latency or a queue occupancy for a queue 121*a-c* associated with the port 106*a-c* from which the packet is to be sent from the switch 103.

A queue latency as used herein may refer to an amount of time data (e.g., packets) spends in a queue 121 before being transmitted from a switch 103. A high queue latency may suggest that the outgoing link is currently congested and/or unable to handle additional traffic. For example, queue latency for a queue 121*a* associated with the port 106*a* may refer to an amount of time data spends in the queue 121*a* before being transmitted from the switch 103.

Queue occupancy as used herein may refer to an amount of data (e.g., a number of packets or a number of bytes) in a queue 121 waiting to be sent from a switch 103. A high queue occupancy may suggest that the outgoing link is currently congested and/or unable to handle additional traffic. For example, a queue occupancy for a queue 121*a* associated with the port 106*a* may refer to an amount of data waiting in the queue 121*a* to be sent from the switch 103.

In some implementations, a switch 103 may measure congestion level towards each the destination using a combination of queue latency and queue occupancy. In some implementations, the switch 103 may be enabled to convert one or both of the queue latency and queue occupancy into a number which can be compared to one or more thresholds. The switch 103 may compare the congestion, for example based on the queue latency and/or occupancy, to a range consisting of an upper threshold and a lower threshold.

At 509, the switch 103 may determine whether the congestion is within a range, i.e., below an upper threshold and above a lower threshold. It should be appreciated that the thresholds may be inclusive or exclusive in various implementations. Furthermore, it should be appreciated that in some implementations the range may include only an upper threshold or only a lower threshold. For example, an upper threshold may be set to a maximum capability such that the upper threshold is never surpassed. Similarly, a lower threshold may be set to zero such that the lower threshold is never crossed.

If the congestion is within the range, the switch 103 may conclude the method 500 by forwarding the packet toward the destination at 521. If, on the other hand, the congestion is outside the range, the switch 103 may generate an ARN packet based on determining the congestion associated with the destination is outside the range. The ARN packet generated by the switch may include an indication of the destination of the packet and either a positive indication or a negative indication. The indication of the destination of the packet may include a truncated version of the packet. For example, the switch 103 may truncate the payload of the packet and wrap the header of the packet into the ARN packet. In this way, when the source of the packet receives the ARN packet, the source can identify the destination of the packet which caused the ARN packet. As described below, the source, upon receiving the ARN packet, may respond to the ARN packet based in part on the destination of the packet which caused the ARN packet. The positive or negative indication in the ARN packet may include a single bit, i.e., a one or a zero, in a header (or another portion of the ARN packet). For example, a one in the positive or negative indication field may indicate the ARN packet is positive while a zero in the positive or negative indication field may indicate the ARN packet is negative.

At 515, if the congestion is above the upper threshold, or at least equal to the upper threshold in some implementations, the switch 103 may generate a negative ARN packet and send the negative ARN packet to the source of the packet received at 503. Generating a negative ARN packet may in some implementations involve duplicating the packet received at 503 which prompted the negative ARN packet, truncating the payload of the packet, and encapsulating the truncated version of the packet with a new header. The new header may indicate the ARN packet is a negative ARN packet.

After generating the negative ARN packet, the negative ARN packet may be sent from the switch 103 to the source of the packet received at 503. For example, in the network of switches illustrated in FIG. 2, if the method 500 is performed by a switch 103*e* which received, at 503, a packet from switch 103*a*, the switch 103*e* may respond by sending the negative ARN packet to the switch 103*a* in response to the packet received at 503. After sending the negative notification packet to the source, the switch 103 may receive a reduced amount of traffic associated with the destination from the source. The response of a switch which receives an ARN packet is described in greater detail below in relation to FIG. 6.

At 518, if the congestion is not above the upper threshold, and is thus below (or equal to in some implementations) the lower threshold, the switch 103 may generate a positive ARN packet and send the positive ARN packet to the source of the packet received at 503.

Generating a positive ARN packet may in some implementations involve duplicating the packet received at 503 which prompted the positive ARN packet, truncating the payload of the packet, and encapsulating the truncated version of the packet with a new header. The new header may indicate the ARN packet is a positive ARN packet.

After generating the positive ARN packet, the positive ARN packet may be sent from the switch 103 to the source of the packet received at 503. For example, in the network of switches illustrated in FIG. 2, if the method 500 is performed by a switch 103*e* which received, at 503, a packet from switch 103*a*, the switch 103*e* may respond by sending the positive ARN packet to the switch 103*a* in response to the packet received at 503. After sending the positive notification packet to the source, the switch 103 may receive an increased amount of traffic associated with the destination from the source. The response of a switch which receives an ARN packet is described in greater detail below in relation to FIG. 6.

In some implementations, the method 500 may further involve executing one or more ARN generation timers 315 as illustrated in FIG. 3. Such ARN generation timers 315 may be used to prevent the switch 103 performing the method 500 from generating an excessive number of ARN packets.

In some implementations, a switch 103 may operate a plurality of ARN generation timers 315. For example, a switch 103 may operate a different ARN generation timer 315 for each port 106 or for each possible destination switch 103. For example, a spine switch 401 in the network 400 illustrated in FIG. 4 may in some implementations operate N ARN generation timers, with one ARN generation timer 315 for each leaf switch 404, 405, 406 with which the spine switch 401 communicates.

Operating an ARN generation timer 315 may comprise running the timer on a repeating loop which begins every time the switch 103 generates and/or sends an ARN packet associated with a destination with which the ARN generation timer 315 is associated. For example, a spine switch 401 may operate an ARN generation timer 315 associated with a leaf switch 404. After the spine switch 401 sends a first ARN packet to the leaf switch 404, the ARN generation timer 315 may begin counting down from a particular value. The spine switch 401 may not send a second ARN packet to the same leaf switch 404 until the ARN generation timer 315 counts back down to zero. The value from which the ARN generation timer 315 counts down may be set by a user or may be based on configuration settings which may be editable by system administrators.

Figure 6:
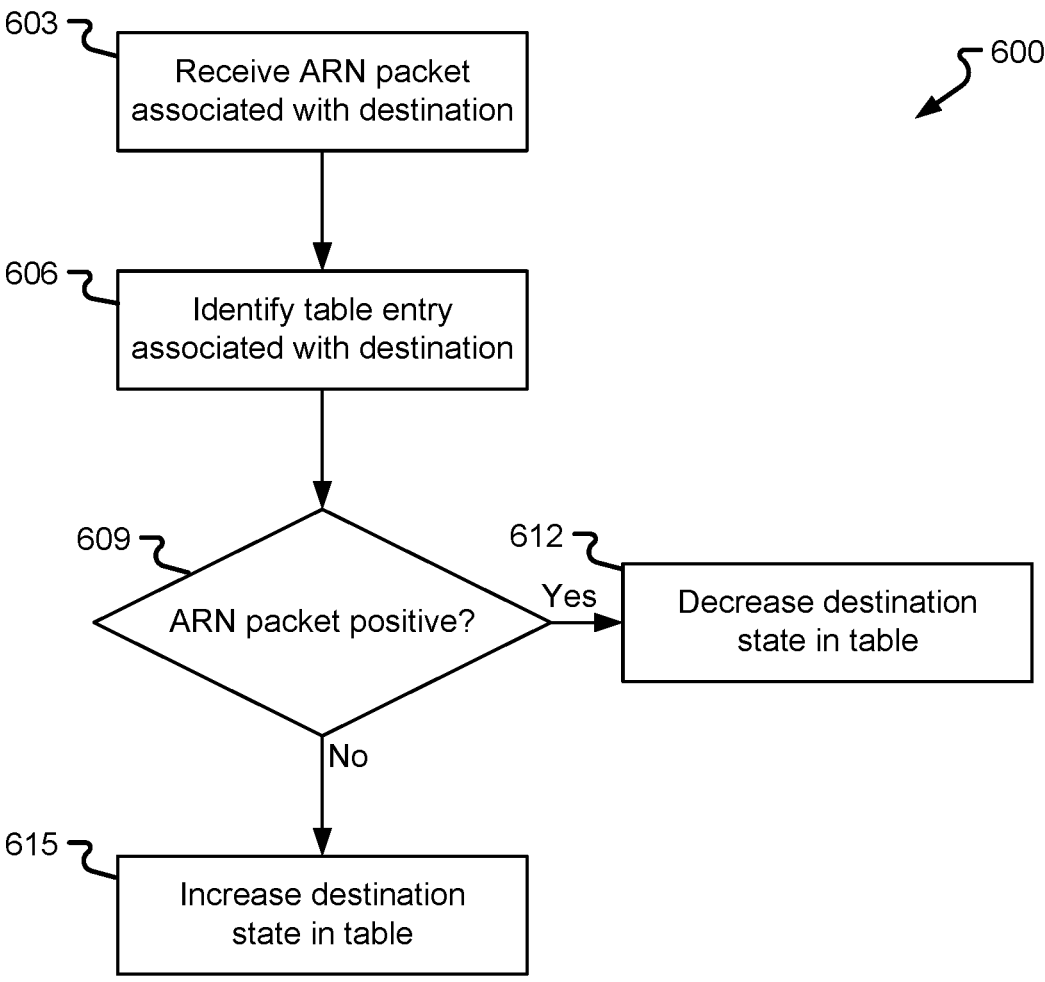

FIG. 6 illustrates a method 600 which may be performed by a switch 103 in response to receiving an ARN packet. The method 600 may be performed by any type of switch 103 which may receive an ARN packet, such as a leaf switch 404, 405, 406 as illustrated in FIG. 4 or a switch 103*a-d* as illustrated in FIG. 2.

At 603, the switch 103 receives an ARN packet. The ARN packet may be received in response to a packet previously sent by the switch 103 as described above. The ARN packet may include some information indicating the destination to which a packet previously sent by the switch which prompted the ARN packet was addressed. For example, as described above, an ARN packet may include a truncated portion of a packet sent by the switch 103 which receives the ARN packet. Such a truncated portion may be a header of the packet sent by the switch 103 and may indicate a destination to which the packet sent by the switch 103 was directed.

At 606, the switch 103 may identify a table entry associated with a destination of the ARN packet. In some implementations, identifying the table entry may involve determining from which port or switch the ARN packet was received and determining with which destination the ARN packet is associated. The table entry associated with the destination of the ARN packet may be a destination state 318 associated with the destination with which the ARN packet is associated and stored in an entry of a state table 306 associated with the port or switch from which the ARN was received. The destination state 318 may be a notification entry of a state table 306 associated with a route list entry of a route list table 303. The route list entry of the route list table 303 associated with the notification entry of the state table 306 may be determined by the switch based on the port or switch the ARN packet was received.

To identify the table entry associated with the destination of the ARN packet, the switch may first determine the destination with which the ARN packet is associated. Based on the destination with which the ARN packet is associated, the switch may find a relevant route list table 303 entry. In some implementations, the switch 103 may perform a longest prefix match (LPM) algorithm to associate the destination of the ARN packet with a route list entry of a route list table 303. Next, the switch 103 may match the route list entry with a relevant entry of a state table 306. Matching the route list entry with the relevant entry of the state table 306 may comprise performing one-to-one matching. Finally, the switch may locate a relevant destination state 318 within the relevant entry of the state table 306 based on the port or switch from which the ARN packet was received.

At 609, the switch may determine whether the ARN packet is indicated as a positive ARN packet or a negative ARN packet. In some implementations, ARN packets may include a bit indicating whether the packet is a positive or negative ARN packet. For example, a one in a particular field of the ARN packet may indicate the ARN packet is a positive ARN packet. Based on the polarity of the ARN packet, the switch may either increase or decrease the identified entry of the table associated with the first destination associated with the notification packet based on data in the notification packet. By increasing or decreasing the identified entry of the table associated with the first destination associated with the notification packet based on data in the notification packet, the switch may adjust a bandwidth or a probability of sending data to the destination associated with the ARN packet.

To illustrate, consider a first leaf switch 404 of a network 400 as illustrated in FIG. 4 sending a packet to a second leaf switch 405 via a spine switch 401. In response to the packet, the first leaf switch 404 receives an ARN packet generated by the spine switch 401. Based on the ARN packet, the first leaf switch 404 may identify a route list entry associated with the second leaf switch 405 of a route list table 303. Next, the first leaf switch 404 may identify a destination state 318 associated with the spine switch 401. If the ARN packet is indicated as a positive ARN packet, the first leaf switch 404 may decrease the destination state 318 associated with the spine switch 401 in the notification entry for the second leaf switch 405, thus increasing the bandwidth of data sent towards the second leaf switch 405 via the spine switch 401. If the ARN packet is indicated as a negative ARN packet, the first leaf switch 404 may decrease the destination state 318 associated with the spine switch 401 in the notification entry for the second leaf switch 405, thus increasing the bandwidth of data sent towards the second leaf switch 405 via the spine switch 401.

Continuing the method 600, if the ARN packet is positive, the relevant destination state entry may be decreased by one (or another value). In some implementations, zero may be the minimum value of the destination state entries. If the ARN packet is negative, the relevant destination state entry may be increased by one (or another value). In some implementations, a maximum value of the destination state entries may be limited by the number of bits in the field.

After adjusting the destination state based on the ARN packet, the switch 103 may continue to route packets based on the table. The switch 103 may use the destination state values to control the percentage of bandwidth sent using an adaptive routing mechanism. For example, when a first leaf switch 404 receives a packet for forwarding to a second leaf switch 405 via a spine switch 401, 402, 403, the first leaf switch 404 may locate a route list table 303 entry associated with the second leaf switch 405, check the notification entry of the state table 306 associated with the route list table 303 entry associated with the second leaf switch 405, and determine which of the M spine switches 401, 402, 403 to forward the packet via based on the destination states 318*a-c*.

For example, when a switch 103 receives a packet to be forwarded from the switch 103, the switch 103 may first determine the destination for the packet. The destination may be a node 203 or another switch 103 in the network. Determining the destination for the packet may comprise processing a header of the packet to determine a destination address for the packet. Next, to route the packet towards the destination, the switch 103 may forward the packet to another switch 103 along a path towards the destination.

The determination as to which switch 103 to route the packet to ensure the packet reaches its destination of switch 103*d* and node 203*h* may be made based on a destination state in table data such as illustrated in FIG. 3. The switch 103*a* may locate a route list entry associated with either the destination switch 103*d* or the destination node 203*h* in a route list table 303. Then, after matching the route list entry associated with either the destination switch 103*d* or the destination node 203*h* in the route list table 303 with a notification entry in a state table 306, the switch 103*a* may be able to choose whether to send the packet via either the spine switch 103*e* or the spine switch 103*f* based on destination states 318*a-c* associated with each of the spine switch 103*e* or the spine switch 103*f*.

For example, in the network illustrated in FIG. 2, if a first switch 103*a* receives a packet from a first node 203*a* and the packet has a destination indicating node 203*h*, the first switch 103*a* may identify the destination as either the node 203*h* or the switch 103*d* to which the node 203*h* is connected. To route the packet towards the node 203*h*, the first switch 103*a* may be required to choose between routing the packet towards either the spine switch 103*e* or the spine switch 103*f*. To make the choice between routing the packet towards spine switch 103*e* or spine switch 103*f*, the first switch 103*a* may poll destination state entries associated with each of the spine switches 103*e*, 103*f* for the destination of the node 203*h* or the switch 103*d* and may choose the spine switch with the lowest value destination state entry.

In some implementations, an aging timer 312 may be operated by a switch 103 to decrease destination state table entries over time. As a result, each ARN packet may only cause a drop in bandwidth for a limited amount of time. For example, a switch may decrease each destination state by one at intervals based on a predetermined amount of time. The amount of time may be based on configuration settings and/or may be set by a user or application based on preferences and use case.

It is to be appreciated that any feature described herein can be claimed in combination with any other feature(s) as described herein, regardless of whether the features come from the same described embodiment.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A switch comprising one or more circuits to:
   in response to receiving a packet, determine one or more of a queue latency and a queue occupancy associated with destination of the packet;
   determine the one or more of the queue latency and the queue occupancy associated with the destination of the packet is outside a range, wherein determining the one or more of the queue latency and the queue occupancy associated with the destination of the packet is outside the range comprises determining a value in a state table entry associated with the destination is outside the range, and wherein the one or more circuits are further to execute a timer and decrease the value in the state table entry over time based on the timer;

based on determining the one or more of the queue latency and the queue occupancy associated with the destination of the packet is outside the range, generate a notification packet; and
   send the notification packet to a source of the packet.

2. The switch of claim 1, wherein the range includes an upper threshold and a lower threshold.

3. The switch of claim 2, wherein the one or more of the queue latency and the queue occupancy associated with the destination is higher than the upper threshold and the notification packet comprises a negative indication.

4. The switch of claim 3, wherein after sending the notification packet to the source, the switch receives a reduced amount of traffic directed to the destination from the source.

5. The switch of claim 2, wherein the one or more of the queue latency and the queue occupancy associated with the destination is lower than the lower threshold and the notification packet comprises a positive indication.

6. The switch of claim 5, wherein after sending the notification packet to the source, the switch receives an increased amount of traffic associated with the destination from the source.

7. The switch of claim 1, wherein determining the one or more of the queue latency and the queue occupancy associated with the destination is outside a range comprises converting the queue latency and the queue occupancy into a number and comparing the number to one or more thresholds.

8. The switch of claim 1, wherein the notification packet comprises one of a positive indication and a negative indication and an indication of the destination.

9. The switch of claim 1, wherein generating the notification packet is further based on the timer.

10. A system comprising one or more circuits to:
    receive a notification packet, wherein the notification packet is associated with a first destination of a plurality of destinations;
    perform a longest prefix match algorithm to associate the notification packet with an entry of a table associated with the first destination, wherein the table includes a plurality of entries, wherein each entry indicates a bandwidth for a respective destination of the plurality of destinations, and wherein the one or more circuits are further to execute a timer and one of increase and decrease the each entry of the table over time based on the timer; and
    one of increase and decrease the bandwidth indicated by the entry of the table associated with the first destination based on data in the notification packet.

11. The system of claim 10, wherein associating the notification packet with the entry of the table comprises identifying the first destination associated with the notification packet.

12. The system of claim 10, wherein the notification packet comprises at least a portion of a packet sent from the system.

13. The system of claim 10, wherein one of increasing and decreasing each entry of the table based on the timer comprises increasing the bandwidth for each of the plurality of destinations.

14. The system of claim 10, wherein the notification packet includes one of a positive indication and a negative indication.

15. The system of claim 10, wherein each entry of the table is associated with a maximum bandwidth and a minimum bandwidth.

16. The system of claim 10, wherein the one or more circuits are further to route one or more packets based on the table.

17. A device comprising one or more circuits to:

in response to receiving a packet, determine one or more of a queue latency and a queue occupancy associated with a destination of the packet, wherein the destination of the packet is a first destination of a plurality of destinations;

determine the one or more of the queue latency and the queue occupancy associated with the destination of the packet is outside a range, wherein determining the one or more of the queue latency and the queue occupancy associated with the destination of the packet is outside the range comprises determining a value in a state table entry associated with the destination is outside the range, and wherein the one or more circuits are further to execute a timer and decrease the value in the state table entry over time based on the timer;

based on determining the one or more of the queue latency and the queue occupancy associated with the destination of the packet is outside the range, generate a first notification packet;

send the first notification packet to a source of the packet;

receive a second notification packet, wherein the second notification packet is associated with a second destination of the plurality of destinations;

perform a longest prefix match algorithm to associate the second notification packet with an entry of a table associated with the second destination, wherein the table includes a plurality of entries, wherein each entry is associated with a respective destination of the plurality of destinations and indicates a bandwidth for the respective destination; and one of increase and decrease the entry of the table associated with the second destination based on data in the second notification packet.

18. The device of claim 17, wherein the one or more of the queue latency and the queue occupancy associated with the first destination is compared with two thresholds including an upper threshold and a lower threshold.

* * * * *